March 20, 1934.  H. HEYMANN ET AL  1,951,828
UNBALANCE INDICATING DEVICE
Filed Feb. 19, 1930
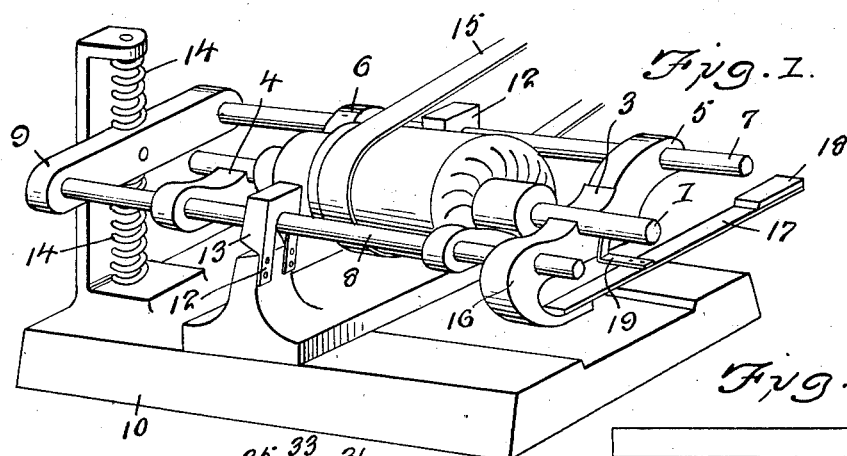
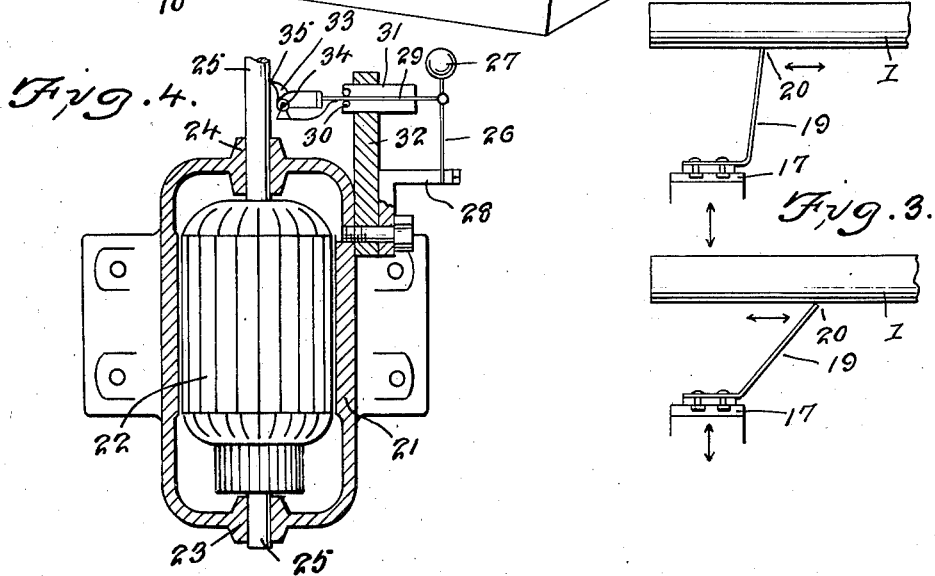
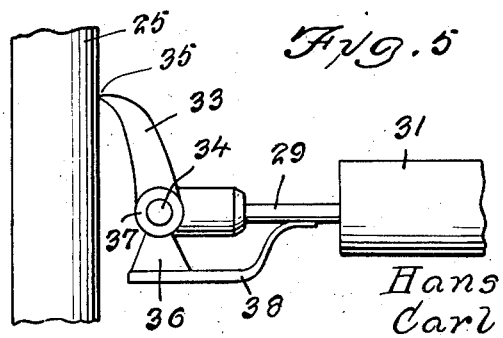
Inventors
Hans Heymann
Carl Ohly
By A. B. Foster
Attorney Patented Mar. 20, 1934

1,951,828

UNITED STATES PATENT OFFICE 1,951,828

UNBALANCE INDICATING DEVICE

Hans Heymann and Carl Ohly, Darmstadt, Germany

Application February 19, 1930, Serial No. 429,791
In Germany December 29, 1928

3 Claims. (Cl. 73—51)

One of the most important problems when balancing rapidly rotating bodies is the determination of the position of the radial plane in which the balancing body is to be positioned on the unbalanced body.

Appliances used hitherto for this purpose no longer permit of accurately determining this position when dealing with unbalanced bodies of small dimensions or if in consequence of slight unbalance, only very slight oscillations occur. Such slight oscillations, indicating the unbalance, occur if the rotary bodies are adapted to be weighted in their operative position (as is frequently desired) for the purpose of eliminating vibrations occurring in operations in rapidly running machines such as electric motors, grinding machines, machine tools and the like. The working bearings are naturally constructed as rigidly as possible so as to prevent as effectively as possible, oscillations of the rotary part of the machine, while for ascertaining the weight error, that is to say for determining the axial plane in which the weighted mass is effective, the occurrence of oscillatory movements which are as large as possible is desirable, so that clear indications are obtained.

According to the present invention a clear indication is obtained in these difficult cases by virtue of a secondary mechanically oscillatable structure which is caused to oscillate by the weighted mass of the unbalanced body, these oscillations being capable of increasing up to resonance. This secondary oscillatable structure can easily be so selected that it carries out substantially larger oscillations than those set up by the oscillatable parts of the weighted machine primarily actuated by the unbalanced body.

In the simplest case this additional or secondary oscillatable structure is directly connected to the primarily oscillatable structure including the unbalanced body, for example by provision that the spring device of the secondary oscillatable structure engages the mass of the primary oscillatable structure.

In this manner the oscillations are recorded in known manner preferably on the periphery of the unbalanced body or its shaft, but in accordance with the invention the oscillations which are recorded are those of the secondary oscillatable structure which is actuated by the primary oscillatable structure including the unbalanced body. This secondary oscillatable structure is brought into resonance at a predetermined speed of rotation of the unbalanced body, by the weighted mass thereof, whereby the oscillations are particularly clearly indicated on the unbalanced body shaft or the like.

This secondary structure, actuating the recording mechanism, may be tuned to the same frequency as the primarily actuated oscillatable structure of the machine itself. Preferably, however, the natural frequency of the additional or secondary oscillatable structure differs from that of the primarily actuated oscillatable structure. In this case resonance of the secondary oscillatable structure may occur at a higher speed of rotation than that of the unbalanced body. Preferably, however, this is desirable, if the speed of rotation of the unbalanced body is not to be carried up to resonance of its system. Then, the natural frequency of the secondary oscillatable structure must occur at a lower speed than that of the primary system. In this case the unbalanced body in the balancing machine is first brought to a speed of rotation a little above that corresponding to the natural frequency of the secondary oscillatable structure, so that when decreasing the speed of rotation of the body to be balanced it passes through a value corresponding to the natural frequency of the secondary oscillatable structure. In this moment the records are made.

In order to enable the natural frequency of the secondary oscillatable structure to be selected according to the conditions prevailing at any time it is advisable to render the natural frequency of this structure capable of variation for example by varying the spring constants, the mass or the moment of inertia.

When weighting the unbalanced body during operation, the secondary oscillatable structure is connected for example to the bearings, constructed for the purpose of operation, to the rotary body or to the machine casing, and it is caused to oscillate in the vicinity of resonance by the weighted mass of this body, the oscillations being recorded relative to the positions of rotation of the body for example on the periphery of the shaft. The oscillatable structure producing the records preferably constitutes a separate mechanism which can be applied as desired to the machine to be tested.

It is not necessary to cause the unbalanced body to rotate at a speed corresponding to resonance of the primary oscillatable structure, because the secondary oscillatable structure greatly amplifies slight vibrations of the primary oscillatable structure.

A few of the numerous possible forms of construction of the subject of the invention are illustrated by way of example in the accompanying drawing, partly diagrammatically and partly in perspective.

Figure 1 illustrates, in perspective, a modification of applicants' invention in which is shown a device for determining the unbalance of a body, the testing device comprising a primary oscillatable structure and a secondary oscillatable structure as hereinafter more fully described.

Figure 2 is a detailed showing of a portion of the shaft of the unbalanced body of Figure 1, and also showing in enlarged view the stylus which produces markings on the shaft indicating the unbalance of the body under examination.

Figure 3 is a detail showing of the shaft and stylus in Figure 2, which showing illustrates the inclination of the stylus with respect to the axis of the shaft of the unbalanced body.

Figure 4 is a further modification of applicants' invention illustrating the mode of adding the secondary oscillatable structure to a body whose unbalance is to be determined, while the said body is in normal operative position.

Figure 5 is a showing designed to illustrate the stylus in operative position with respect to the shaft of the body whose unbalance is to be determined.

Figure 6 is a further modification of applicants' invention in which merely the secondary oscillatable structure is shown, and this modification illustrates means for adjusting the natural frequency of the secondary oscillatable structure.

Figure 7 is a further modification of applicants' invention in which another form of the secondary oscillatable structure is illustrated.

Figure 8 is an illustration of a further modification of applicants' invention showing a portion of the casing of the machine to be tested, and further modification of applicants' secondary oscillatable structure, this particular modification comprising symmetrically disposed styli adapted to prevent jamming of the stylus during the test operations.

Figure 9 is a further modification of applicants' invention particularly designed to illustrate a further modification of the secondary oscillatable structure.

Figure 10 is a further modification of applicants' invention showing a portion of the casing of the machine, of the body to be tested, a diagrammatic showing of the rotating shaft of the said machine and a further modification of the secondary oscillatable structure.

In order to describe the invention fully, reference is had to the accompanying drawing. First, with reference to Figure 1 of the drawing, the unbalance of a rotor 2, having a shaft 1 is determined by placing the rotor so that the shaft 1 is mounted in the open bearings 3 and 4 of the two brackets 5 and 6, slidably mounted on the two rods 7 and 8 of a frame 9. This frame is pivotally mounted on the bedplate 10 by means of a support 11 and a link block 12 and 13. The upper part 13 of the link is slidably mounted on the rod 8. Springs 14 attached to the frame 9 permit vertical oscillations of the frame 9 and the body 2 which is to be balanced. The body 2 can be rotated by any suitable means, for example by means of a belt 15 driven by a motor (not shown). The bracket 16 which is fixed on the rod 8 is attached to a blade spring 17, which blade spring 17 has a mass 18 fixed to its end. The structure 17 and 18 forms what applicants term a secondary oscillatable structure, which oscillatable structure oscillates in a vertical direction, as does the structure including frame 9, the rods 7 and 8, the body 2 and the springs 14, this latter structure being designated by the applicants as the primary oscillatable structure. The amplitudes of the oscillations of the secondary oscillatable structure are very large in comparison with those of the primary oscillatable structures, due to the fact that the blade spring 17 is much more flexible than the spring 14, and the mass 18 of the secondary structure is much smaller than the masses of the primary structure. The blade spring 17 carries a member 19, which applicants have designated as a stylus. In the illustration under consideration the stylus 19 consists of a small blade spring, the end 20 of which presses against the shaft 1 (see Figures 2 and 3). The soft spring 19 contacts the shaft 1 in such a manner that the blade thereof forms an acute angle with the principal axis of the shaft when the member 17 is nearest the shaft (see Fig. 3). As a result of the angle made by the stylus 19 with the axis of the shaft 1, the vertical motion of the blade spring 17 will cause the end 20 of the blade spring 19 to move axially along the shaft. In order to indicate the path of the member 19 on the shaft 1, the said shaft is dusted with powdered chalk or any other fine substance. The end 20 of the stylus 19 will make markings or scratches in the powdered substance dusted on the shaft, thus indicating the unbalance of the body under examination.

Figure 4 is a horizontal section taken through the casing of an electrical motor, and in this case the unbalance of the rotor 22 is to be determined. In this case also the rotor is not removed from its operative position and placed in a special machine as illustrated in Figure 1, but may be tested in its normal operating position. If the rotor 22 is unbalanced, it will while rotating rapidly, produce small oscillations or vibrations in the bearings 23 and 24. These small vibrations are sufficient to induce oscillations in the secondary oscillatable structure 26 and 27, which oscillations are large enough to produce clear records and indications of the unbalance of the shaft 25. The spring 26 of the secondary oscillatable structure is firmly fixed to the bracket 28, which in turn is firmly attached to the casing 21 of the motor. The oscillations of the secondary oscillatable structure 26 and 27 actuate a push-rod 29 guided by means of small rollers 30, mounted in a small tube 31 fixed in a bracket 32 firmly attached to the casing 21. A lever 33 is pivotally mounted at 34 on the push-rod 29. The point 35 of this lever inscribes the records on the shaft 25, as was stated in connection with the description of Figure 1. A portion of the powdered chalk or other powdered substance is dusted on the shaft and it is the markings or scratchings in this chalk by the pointer 35 which indicates the unbalance of the rotor. A small brake 36 actuated by a spring 38 affixed to the push-rod 29 is urged against the hub or boss 37 of the lever 33 (see Figure 5), so that this lever 33 moves only in one direction during the determination of the unbalance.

Figure 6 is a perspective showing of a further modification of applicants' invention, and is designed to show, in particular, a secondary oscillatable structure whose frequency may be adjusted. In this modification, the primary oscillatable structure is not shown. The secondary oscillatable structure consists of a blade spring 38 and a mass 39, which mass is adjustable vertically on the blade spring 38, thus providing means for adjusting the frequency of the vibrating system consisting of blade spring 38 and mass 39. A soft spring 37 bears against shaft 36, the member 37 serving as a stylus. This stylus 37 moves axially with respect to the axis of the shaft 36 by virtue of the fact that it bears against the shaft at an acute angle. The member 38 is connected to the casing of the machine (not shown) to be tested at a convenient point.

In Figure 7, a further modification of applicants' invention is illustrated, in which a secondary oscillatable structure comprising a modified form is shown. The secondary oscillatable structure consists of a blade spring 42 and a mass 44. The blade spring 42 is adjustable longitudinally by unscrewing the screw 47. The blade spring 42 has a scale at the end thereof at 43 which enables the adjustment of blade spring 42 at any desired point. In this form of construction the oscillatory structure 42, 44 is separated from the actual recording mechanism. The stylus 41 is in this case guided by a light invariable spring 48 or a link of any suitable type. The spring 48 preferably bears freely against the spring 42 so that this only moves the stylus with it during one half of the oscillation. The stylus 41 bears against the shaft 40 in the same manner as in the previous modifications. The member 45 is a holder, and it carries a pointer 46 from which the frequency of the oscillations may be read off on scale 43. The holder 45 is similar to the bracket 16 of Figure 1.

Forms of construction in accordance with the invention which are particularly suitable for examining and balancing rotary bodies when mounted in their bearings for operation are shown in Figures 8 to 10. The secondary oscillating structures here shown are preferable because they have a compact construction thus they may be applied to a machine where the space is limited, and also permit recordings to be made on the rotary body, for example on a free portion of its shaft.

In Figure 8 the oscillatory structure of the appliance is mounted in a narrow tubular casing 48' which can be introduced through a suitable opening which is already present or is provided for the purpose in the machine casing 49. The oscillating structure in the interior of the tube 48 consists in the example illustrated of a mass 50 mounted on a push rod 51 and springs 52 engaging with the rod 51 and bearing against the casing 48'.

The recorder in the example illustrated does not consist of a single spring, but of two symmetrically disposed springs 53 of which the points are located closely in front of the shaft 54, of the rotating body. By the symmetrical construction of the device forces acting only in one direction are eliminated. At the same time there are obtained two diagrams 55 and 56 so as to avoid the danger of the result being unreadable or the record being otherwise useless. That is to say, the fact that there are two springs, would tend to prevent jamming.

When using this device the speed of rotation of the rotary body or the natural period of oscillation of the oscillating structure 50 and 52 is so adjusted that this passes through its resonance whereby the vibrations of the casing 49 set up by the weight fields produce the oscillations. These oscillations are recorded on the shaft in the form of the curves 55 and 56.

Figure 9 shows a substantially similar device which, however, is only provided with a single recording spring 53, and without a tubular casing such as 48' of Fig. 8 for the reception of the oscillating structure. This device may be used where space is extremely limited.

In the device according to Figure 10 no provision is made for lateral movement of the recording pin which produces the records.

In this modification two separate oscillating masses 57 and 58 are mounted on a common blade spring 56 each of which is provided with a thin spring blade 59 as a recording spring. The ends of these springs are brought together to form a sharp cutter 64 and serve as the recording member. The device is supported by a rod 62 which is guided in a tube 60, passed through the casing 61 and which may be guided if desired in a straight line by a link 63 of any suitable type. This arrangement is suitable for recording very small oscillations as the length of the records in this case are extremely short. The records are made on shaft 55.

We claim:—

1. An indicating mechanism for determining the unbalance of rotating bodies comprising a primary oscillatable structure for supporting the member to be balanced and adapted to be oscillated thereby, a secondary oscillatable structure of different natural frequency connected to said primary oscillatable structure and actuated thereby, said secondary oscillatable structure comprising a flexible member and a weight member, the said flexible member being adapted to amplify the oscillations of the said primary oscillatable structure and means actuated by the said secondary oscillatable member for recording the oscillations thereof on the member to be balanced.

2. The combination as set forth in claim 1, in which the secondary oscillating structure comprises a blade spring and a weight member, the said weight member being adjustably mounted on said blade spring.

3. An unbalance indicating device comprising a primary oscillatable structure adapted to be oscillated by the unbalance of a rotating body, a secondary oscillatable structure having a different natural frequency operatively connected to said primary structure to be actuated by the oscillations thereof and means for actuating a stylus operatively connected to said secondary oscillating structure, and adapted to record indications of unbalance on the body to be balanced.

HANS HEYMANN.
CARL OHLY.